United States Patent
Sridharan et al.

(10) Patent No.: US 6,794,462 B2
(45) Date of Patent: Sep. 21, 2004

(54) HIGH-MOLECULAR WEIGHT POLYMERS AND METHODS OF MANUFACTURE

(75) Inventors: Srinivasan Sridharan, Morgan Hill, CA (US); John Armstrong Young, Midlothian, VA (US); Donald James Arthur, Chester, VA (US); Thomas Yiu-Tai Tam, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/266,517

(22) Filed: Oct. 8, 2002

(65) Prior Publication Data

US 2003/0092853 A1 May 15, 2003

Related U.S. Application Data

(60) Provisional application No. 60/335,153, filed on Nov. 14, 2001.

(51) Int. Cl.[7] .................. C08G 63/80; C08G 63/91; C08G 63/08
(52) U.S. Cl. ...................... 525/411; 525/437
(58) Field of Search ................. 525/411, 437

(56) References Cited

U.S. PATENT DOCUMENTS 5,225,497 A  7/1993 Ishii et al. .......... 525/437
5,869,582 A  2/1999 Tang et al. .......... 525/415

FOREIGN PATENT DOCUMENTS

JP  4115  5/1973

OTHER PUBLICATIONS

Notification of Transmittal of International Preliminary Examination Report Form PCT/IPEA/416, Jan. 15, 2004.

William L. Hergenrother and Charles Jay Nelson, "Viscosity–Molecular Weight Relation–Ship for Fractionated Poly(ethylene Terephthalate)", Journal of Polymer Science: Polymer Chemistry Edition, vol. 12, 1974, pp 2905–2915.

Primary Examiner—Jeffrey B. Robertson
(74) Attorney, Agent, or Firm—Margaret S. Millikin

(57) ABSTRACT

A composition comprises a solid-stated block copolymer of an aromatic polyester and a caprolactone, wherein the copolymer has been solid state polymerized such that intrinsic viscosity increases at least 20%, the caprolactone content decreases no more than 1.2% absolute and the transesterification increases no more than 3.5% absolute, and wherein the solid-stated copolymer has an intrinsic viscosity of at least 0.82. Particularly preferred chain extension reactions are performed at a temperature of less than 175° C., and even more preferably at less than 165° C. In further aspects of the inventive subject matter, yarns and methods of producing a fiber include contemplated solid-stated block copolymers.

5 Claims, No Drawings

HIGH-MOLECULAR WEIGHT POLYMERS AND METHODS OF MANUFACTURE

CROSS-REFERENCE TO RELATED APPLICATIONS

This application claims priority to pending U.S. provisional application serial No. 60/335,153, filed Nov. 14, 2001, the entire contents of which are incorporated by reference.

FIELD OF THE INVENTION

The field of the invention is high-molecular weight polymers.

BACKGROUND OF THE INVENTION

Many known copolymers comprising an aromatic polyester and caprolactone are known in the art and used in numerous applications as thermoplastic elastomers. For example, Japanese Patent Publication 4115 (published Feb. 5, 1973) describes copolymers in which the aromatic polyester is poly(ethylene terephthalate) (PET) or poly(butylene terephthalate) (PBT). The average molecular weight of some of these copolymers is within a range of about 500–5,000, which corresponds to an intrinsic viscosity (IV) of less than 0.3 (as measured in a 60/40 by weight mixture of phenol and tetrachloroethane solvents according to William L. Hergenrother and Charles Jay Nelson, "Viscosity-Molecular Weight Relationship for Fractionated Poly(ethylene Terephthalate)", Journal of Polymer Science (1974),12, 2905–2915). Unfortunately, copolymers having such relatively low IV are generally insufficient for spinning high-performance fibers.

The molecular weight can be extended to at least some degree by reacting the aromatic polyester and caprolactone in the presence of a polyfunctional acylation agent, thereby forming a multiblock copolymer as also described in the Japanese Patent Publication 4115. Although such a copolymerization generally increases the molecular weight and intrinsic viscosity of the resulting product, various disadvantages still remain. For example, the intrinsic viscosity of the aromatic polyesters used in such copolymerizations is relatively low. Consequently, the resulting copolymers and multiblock copolymers will exhibit comparably low molecular weight, intrinsic viscosity, and relatively short block lengths. Moreover, due to the conditions employed during the polymerization process (particularly temperature and residence time in the reactor), the rate of transesterification may be undesirably high.

To circumvent or at least alleviate most of the aforementioned problems with block copolymers comprising an aromatic polyester and caprolactone, copolymerization may be carried out under conditions as described in U.S. Pat. No. 5,869,582 to Tang et al. Tang's co-polymer is formed from an aromatic polyesters with relatively high intrinsic viscosity (IV of about 0.9) and lactone monomers. Furthermore, the copolymerization is performed in a reactor having a configuration that significantly reduces residence time, and wherein the melt in the process of polymerization is under continuous agitation of intermeshing turbulators and homogenization of advancing/combining mixers. However, numerous advanced applications and fibers demand block copolymers with even higher molecular weight and intrinsic viscosity.

While it is known for certain polymers to increase the molecular weight after polymerization in the solid state, solid-stating block copolymers comprising an aromatic polyester and caprolactone using known protocols typically results in an increased molecular weight, but in significant loss of caprolactone concurrent with a substantial increase in transesterification. For example, when temperatures normally employed for PET solid-stating are used in solid stating of a PET-caprolactone copolymer, numerous significant and often undesirable changes may occur. Among other things, at temperatures of about 200° C., the percent esterification can increase by a factor of two, and at temperatures of about 210–215° C., the loss of caprolactone can be as much as 10% of the total amount present.

Although various methods and compositions are known in the art to produce block copolymers from an aromatic polyester and caprolactone, all, or almost all of them suffer from one or more problems. Thus, there is still a need to provide compositions and methods for production of such block copolymers, especially block copolymers with improved intrinsic viscosity.

SUMMARY OF THE INVENTION

The present invention is directed to solid-stated block copolymers from aromatic polyester and caprolactone. Such copolymers have been solid state polymerized under a protocol to increase the intrinsic viscosity at least 20%, while decreasing the caprolactone content no more than 1.2% absolute and increasing the transesterification no more than 3.5% absolute. Preferred solid-stated copolymers have an intrinsic viscosity of at least 0.82.

In one aspect of the inventive subject matter, the protocol includes heating of the copolymer to a temperature of no more than 175° C., more preferably to a temperature of no more than 165° C., wherein the heating is preferably performed under a nitrogen sweep. It is further contemplated that especially where the aromatic polyester comprises poly (ethylene terephthalate), the decrease in caprolactone content is no more than 0.1% absolute, and the increase in transesterification is no more than 0.2% absolute. In further alternative aspects, the increase in intrinsic viscosity of such polymers is at least 35% and the increase in transesterification is no more than 0.6% absolute.

In another aspect of the inventive subject matter, the aromatic polyester in preferred copolymers is a poly (alkylene terephthalate) such as poly(ethylene terephthalate) and poly(butylene terephthalate), a poly(alkylene naphthalate) such as poly(ethylene naphthalate) and poly (butylene naphthalate), or a poly(cycloalkylene naphthalate).

In a still further aspect of the inventive subject matter, a method of producing a fiber comprises a step in which contemplated block copolymers are provided. In a further step, the copolymer is solid-stated to achieve an increase in intrinsic viscosity of at least 20%, a decrease in caprolactone content of no more than 1.2% absolute, and an increase in transesterification of no more than 3.5% absolute, wherein the solid-stated copolymer has an intrinsic viscosity of no less than 0.82. In a still further step, the solid-state polymerized copolymer is spun to a fiber. Consequently, it is contemplated that yarns may be spun from contemplated block copolymers.

Various objects, features, aspects and advantages of the present invention will become more apparent from the following detailed description of preferred embodiments of the invention.

DETAILED DESCRIPTION

The inventors discovered that a block copolymer of an aromatic polyester and a caprolactone can be solid-stated (i.e., the molecular weight of the polymer can be increased while the polymer is in the solid state) to significantly advance the IV while substantially maintaining caprolactone content and transesterification. More particularly, the inventors surprisingly observed that conditions similar to conditions employed for drying are sufficient for such solid stating.

In a particularly preferred aspect of the inventive subject matter, the block copolymer is a block copolymer of polyethylene terephthalate and caprolactone with IV of about 0.76, a caprolactone content of about 13.2 wt %, and a transesterification of approximately 5.2%, which is commercially available from Honeywell under the trade name SECURUS™ material, and which is solid-stated using the following protocol: Crystallization cycle at 120° C. under vacuum at 15 mm Hg for 8 hrs, followed by incubation at 152° C. under nitrogen sweep for 24 hrs.

However, it should be appreciated that while a block copolymer of polyethylene terephthalate and caprolactone with an IV of about 0.76, a caprolactone content of about 13.2 wt %, and a transesterification of approximately 5.2% may be used, numerous alternative copolymers are also considered suitable for use in conjunction with the teachings presented herein. For example, the aromatic polyester in alternative copolymers need not be restricted to polyethylene terephthalate, but may also include other poly(alkylene terephthalates), poly(alkylene naphthalates), and poly(cycloalkylene naphthalates), wherein the alkylene unit in such polymers may have between 2 to 10 carbon atoms, and more preferably between 2 and 6 carbon atoms. Further preferred copolymers have a caprolactone content of no more than 30 mol %, and more preferably of no more than 15 mol %.

While it is generally preferred that contemplated copolymers are block copolymers, it should also be appreciated that additional blocks may be included in suitable copolymers. Consequently, multiblock copolymers (e.g., comprising 3, 4, or even more chemically distinctive blocks) are also contemplated. Furthermore, it should be appreciated that where the polymers are multiblock copolymers, all reasonable combinations of suitable blocks are contemplated. In yet further contemplated aspects, suitable copolymers may be derivatized or modified with various substituents and/or functional group. For example, where flame retardancy is particularly desired, contemplated polymers may include bromine or brominated groups. On the other hand, where adhesion to rubbers is desired, contemplated polymers may include epoxy groups.

With respect to the intrinsic viscosity of contemplated copolymers, it should be appreciated that a particular intrinsic viscosity is not limiting to the inventive subject matter. However, it is especially preferred that the IV of suitable copolymers will be in the range of between about 0.5 to 1.4, and more typically in the range of between about 0.6 to 1.2, and most typically in the range of between about 0.8 to 1.1. (As measured in a 60/40 by weight mixture of phenol and tetrachloroethane according to William L. Hergenrother and Charles Jay Nelson, "Viscosity-Molecular Weight Relationship for Fractionated Poly(ethylene Terephthalate)", Journal of Polymer Science (1974),12, 2905–2915).

Similarly, contemplated starting copolymers may have a caprolactone content other than about 13.2 wt % and a transesterification of other than approximately 5.2%. The particular caprolactone content will typically depend on the molar fraction of caprolactone (monomer) in the polymerization mixture and polymerization efficiency of the employed polymerization process. Likewise, the degree of transesterification will predominantly depend on the particular polymerization process (and especially on the temperature and residence time) used in the fabrication of the copolymer. Consequently, it is contemplated that suitable copolymers will include caprolactone in a range of between about 3 wt % to about 85 wt %, more preferably between about 5 wt % to about 40 wt %, and most preferably between about 10 wt % to about 15 wt %. With respect to the degree of transesterification, relatively low degrees are generally preferred, and contemplated degrees of transesterification are in the range of about 0.5% and less to about 25%. However, in especially preferred aspects of the inventive subject matter, the degree of transesterification is less than 10%, and most preferably less than 6%.

Contemplated copolymers may be synthesized following numerous known procedures, and the synthesis of especially preferred copolymers (block copolymers comprising an aromatic polyester and caprolactone) is described in commonly assigned U.S. Pat. No. 5,869,582 to Tang et al., which is incorporated by reference herein. However, all other known protocols for synthesis of contemplated copolymers are also considered suitable for use in conjunction with the teachings presented herein.

With respect to the solid-stating protocol for contemplated copolymers, it should be appreciated that numerous protocols are appropriate, so long as such protocols will increase the IV at least 20%, decrease the caprolactone content of the copolymer no more than 1.2% absolute, and increase the transesterification no more than 3.5% absolute, wherein the solid-stated copolymer has an IV of no less than 0.82.

Consequently, the crystallization cycle may be performed at temperatures other than 120° C. and at a pressure other than vacuum at 15 mm Hg. For example, where crystallization can be performed over a relatively long period, or where a vacuum of less than 15 mmHg is applied, suitable temperatures may be in the range of between about 75° C. to 90° C. and less, or between 90° C. and 119° C. On the other hand, where transesterification occurs at relatively high temperatures, suitable temperatures may be in the range of between about 121° C. to 140° C. and even more. Consequently, the duration of the crystallization may be less than 16 hrs (e.g., between 8 hrs and 12 hrs, and even less), where water is removed at a relatively high rate. On the other hand, and especially where the temperature is relatively low or the vacuum is relatively weak, crystallization times of more than 16 hrs are contemplated. With respect to the vacuum, it is generally preferred that the vacuum is lower than 50 mm Hg, and even more preferably that the vacuum is lower than 20 m Hg. However, in alternative aspects, the vacuum may be in the range between 50 mm Hg and atmospheric pressure. Where the vacuum is relatively weak (i.e., above 50 mmHg), it is especially preferred that the crystallization is performed under a protective gas atmosphere (e.g., nitrogen). Furthermore, it is contemplated that the crystallization cycle may be omitted altogether, or that only partial crystallization may be done, wherein the degree of crystallization may be monitored using X-ray diffraction.

In further alternative aspects of the inventive subject matter, various heating steps other than an incubation at 152° C. under nitrogen sweep for 24 hrs are contemplated. In fact, all heating steps are contemplated suitable so long as alternative heating steps (i.e., incubations at one or more particular temperatures) will increase the IV at least 20%, decrease the caprolactone content of the copolymer no more than 1.2% absolute, and increase the transesterification no more than 3.5% absolute wherein the solid-stated copolymer has an IV of no less than 0.82.

For example, where a relatively low degree of transesterification is especially important, incubation of the copolymer may be performed at a temperature between about 135° C. and 150° C., or between 120° C. and 135° C., and even less. On the other hand, where the incubation period is significantly shorter than 24 hrs, incubation of the copolymer may be performed at a temperature between about 150° C. and 170° C., or between 170° C. and 185° C. and higher. However, it is generally preferred that the incubation is performed at a temperature of no more than 175° C., and more preferably at a temperature of no more than 165° C.

Similarly, the length of the incubation period may vary considerably, and will predominantly depend on the copolymer type, the desired degree of increase in intrinsic viscosity, and the amount of transesterification tolerated. Consequently, suitable incubations periods will generally be in the range of several minutes (and even less) to incubations of one or more days. However, it is generally preferred that the length of incubation will be in the range of about 2 hrs to approximately 24 hrs. It is further preferred that the incubation of the copolymer will be performed under a protective atmosphere, typically under nitrogen sweep.

It should further be appreciated that incubations may be performed at more than one temperature, wherein suitable incubations may include multiple temperature levels and temperature gradients. For example, contemplated incubations may have a segment of incubation at 160° C. for 6 hrs, which may be followed by a segment of incubation at 150° C. for 18 hrs. Alternatively, contemplated incubations may also include a linear (or non-linear) temperature gradient starting at 175° C. to 145° C. over a period of 24 hrs.

In still further alternative aspects of the inventive subject matter, the incubation may be performed in the presence of additional chemical agents. For example, where appropriate, a catalyst may be included in the preparation of contemplated copolymers to assist the chain extension reaction. Alternatively, moisture absorbing agents may included to further remove water not displaced during the crystallization. Moreover, it is generally contemplated that incubation and crystallization of copolymer is independent of the shape or geometry of the copolymer. However, it is also contemplated that surface of copolymer may be increased to potentially increase rate of chain extension. On the other hand, where desirable, the copolymer may also be in form of a sphere to decrease the ratio of surface to volume.

Thus, contemplated solid-stating protocols according to the inventive subject matter will significantly increase the IV while only moderately (e.g., between 0% and 3.5% absolute, more typically between 0% and 0.8% absolute, and most typically between 0% and 0.2% absolute) increasing transesterification and moderately decreasing the caprolactone content. In particular, it should be appreciated that contemplated copolymers will increase the IV in an amount of at least 20%, more preferably in an amount of at least 25%, even more preferably in an amount of at least 35%, and most preferably in an amount of at least 45%. Furthermore, contemplated preferred solid-stating protocols will decrease the caprolactone content in copolymers in an amount of no more than 1.2% absolute, more preferably in an amount of no more than 0.8% absolute, even more preferably in an amount of no more than 0.2% absolute, and most preferably in an amount of no more than 0.1% absolute, while increasing the transesterification in an amount of no more than 3.5% absolute, more preferably in an amount of no more than 2.0% absolute, even more preferably in an amount of no more than 0.6% absolute, and most preferably in an amount of no more than 0.2% absolute.

Chip of the present solid-stated copolymer may be formed. The formed chip may then be used for fiber formation including monofilament, film applications, spunbonded (non-continuous) fiber, molded parts, or extruded profiles.

Furthermore, it is contemplated that yarns may be fabricated from fibers produced from contemplated solid stated block copolymers. Thus, a method of producing a fiber has one step in which a block copolymer comprising an aromatic polyester and a caprolactone is provided. In another step, the copolymer is solid-state polymerized at a temperature sufficient to achieve an increase in intrinsic viscosity of at least 20%, a decrease in caprolactone content of no more than 1.2% absolute, and an increase in transesterification of no more than 3.5% absolute, wherein the solid-stated copolymer has an intrinsic viscosity of no less than 0.82. In still another step, the solid-state polymerized copolymer is spun.

The present composition may be spun into a fiber using a known spinning process. The resulting yarn may be used in numerous industrial fiber applications including webbing, textile, safety belts, parachute harnesses and lines, shoulder harnesses, cargo handling, safety nets, trampolines, high altitudes worker harnesses, military aircraft arrestor tapes, ski tow lines, and rope and cordage applications including yacht and oil derrick cordage.

EXAMPLES

The following examples are provided to illustrate various aspects of the inventive subject matter. In particular, the following examples are based on a block copolymer comprising poly-(ethylene terephthalate) and caprolactone. Among other suitable block copolymers, appropriate block copolymers include the commercially available copolymer under the trade name SECURUS™.

IV was determined using a protocol as described in Viscosity-Molecular Weight Relationship for Fractionated Poly(ethylene Terephthalate), published in the Journal of Polymer Science (1974),12, 2905–2915 by William L. Hergenrother and Charles Jay Nelson. COOH content, % Transesterification, and % Caprolactone were determined by NMR following a protocol as described in U.S. Pat. No. 5,869,582 to Tang et al. IV is expressed as dl/g, while COOH content is indicated as meq/kg. % TE is % transesterification, and % CL is % caprolactone, and are expressed as absolute numbers. Unless indicated otherwise, solid stating conditions are given in hours of incubation at the particular temperature shown in Tables 1 and 2.

TABLE 1

| Sample | Solid Stating Condition | IV | COOH | % TE | % CL |
|---|---|---|---|---|---|
| 1 | SECURUS Chip (Starting Material) | 0.74 | 38 | 5.1 | 13.1 |
| 2 | 5 hrs at 120° C. and 16 hrs at 160° C. | 0.94 | 24 | 5.8 | 13.0 |
| 3 | 8 hrs at 120° C. | 0.77 | 33 | 4.5 | 13.2 |
| 4 | 8 hrs at 120° C. and 24 hrs at 161° C. | 1.01 | 23 | 5.7 | 12.9 |
| 5 | 8 hrs at 120° C. and 25 hrs at 152° C. | 0.94 | 26 | 5.3 | 13.2 |

TABLE 2

| Sample | Solid Stating Condition | IV | COOH | % TE | % CL |
|---|---|---|---|---|---|
| 1 | SECURUS Chip (Starting Material) | 0.74 | 38 | 5.1 | 13.1 |
| 6 | 5 hrs at 120° C., 16 hrs at 160° C., 3 hrs at 180° C., and 16 hrs at 200° C. | 1.45 | 13 | 9.9 | 13.0 |
| 7 | 5 hrs at 120° C., 16 hrs at 160° C., 3 hrs at 180° C., 16 hrs at 200° C., 4 hrs at 200° C., 2 hrs at 210° C., and 7 hrs at 215° C. | 1.91 | 11 | 10.2 | 11.8 |

As can be appreciated from Table 2, higher solid stating temperatures generally tend to increase IV, however, will typically result in significant increase of transesterification, and decrease of caprolactone.

Thus, specific embodiments and applications of high-molecular weight polymers and methods of manufacture have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the reference elements, components, or steps may be present, or utilized, or combined with other elements, components, or steps that are not expressly referenced.

What is claimed is:

1. A method of producing a fiber comprising:

providing a block copolymer comprising a comprising an aromatic polyester and a caprolactone;

solid-state polymerizing the copolymer at a temperature sufficient to achieve an increase in intrinsic viscosity of at least 20%, a decrease in caprolactone content of no more than 1.2% absolute, and an increase in transesterification of no more than 3.5% absolute, wherein the solid-stated copolymer has an intrinsic viscosity of no less than 0.82; and spinning the solid-state polymerized copolymer.

2. The method of claim 1 wherein the aromatic polyester comprises a compound selected from the group consisting of a poly(alkylene terephthalate), a poly(alkylene naphthalate), and a poly(cycloalkylene naphthalate).

3. The method of claim 1 wherein the increase in intrinsic viscosity is at least 35%.

4. The method of claim 1 wherein the increase in transesterification is no more than 0.2% absolute.

5. The method of claim 4 wherein the decrease in caprolactone content is no more than 0.1% absolute.

* * * * *